Feb. 26, 1952     O. H. HENRY     2,587,317
RESONANT VIBRATION FATIGUE TESTER

Filed Oct. 8, 1946     2 SHEETS—SHEET 1

Inventor
OTTO H. HENRY
By
Attorney

Feb. 26, 1952          O. H. HENRY          2,587,317
RESONANT VIBRATION FATIGUE TESTER
Filed Oct. 8, 1946          2 SHEETS—SHEET 2
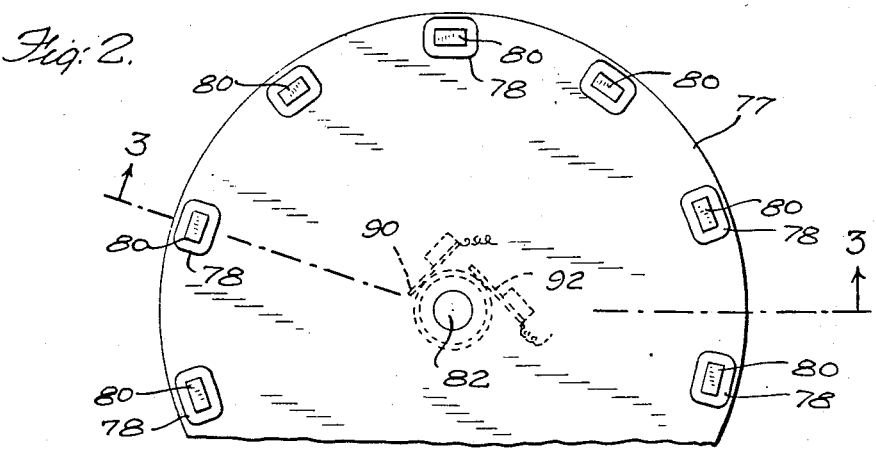
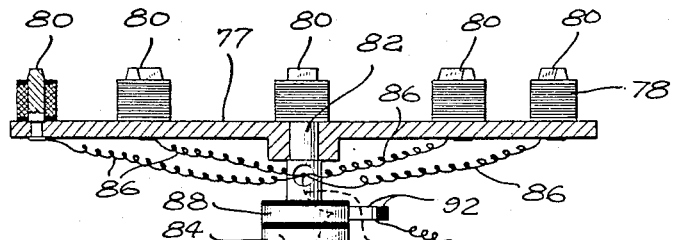
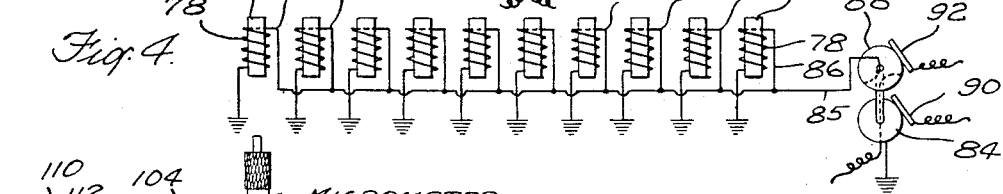
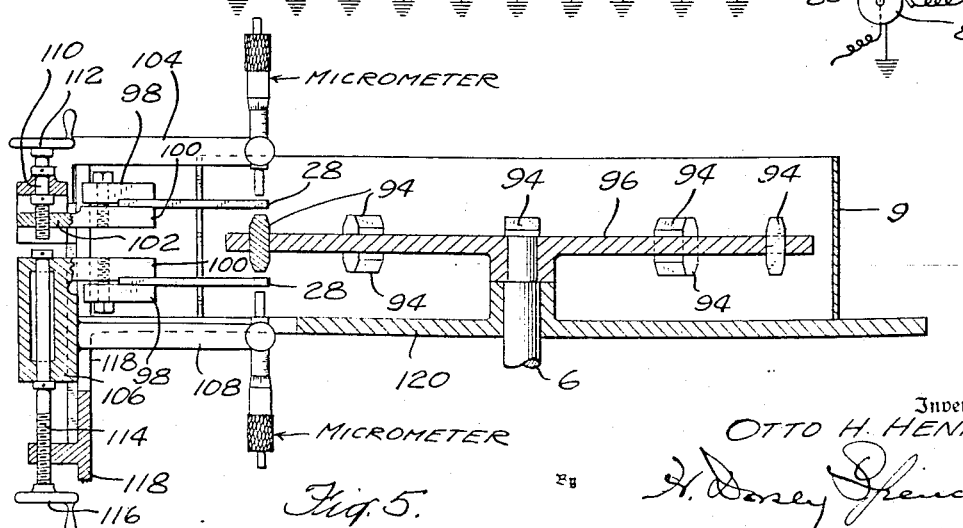
Inventor
OTTO H. HENRY
Attorney Patented Feb. 26, 1952

2,587,317

UNITED STATES PATENT OFFICE 2,587,317

RESONANT VIBRATION FATIGUE TESTER

Otto H. Henry, Caldwell, N. J.

Application October 8, 1946, Serial No. 702,049

10 Claims. (Cl. 73—67)

This invention relates to apparatus for use in testing those fatigue phenomena of construction materials which are brought about by vibration.

Various devices have been designed for testing structural steel and other materials to be used in structures in which the material may be subjected to vibration, in order to determine the liability of the material to failure due to what is known as fatigue. Since the most dangerous vibration conditions to which construction materials are subjected in use are those due to resonant vibrations set up when the vibration producing force tends to cause the part under consideration to vibrate at its natural frequency, resonant vibration fatigue testing devices naturally have provision for so attuning the vibration producing means to the natural frequency of the test piece, or vice versa, as to insure resonant vibration of the test piece.

In many of the devices of the prior art the test piece is arranged to be deflected magnetically by a stationary electromagnet, or electromagnets, so arranged and controlled that the electromagnetic flux is set up and broken down in rapid succession, thus effecting a forced vibration of an otherwise stationary test piece in synchronism with the alternating flux. In some of these devices provision is made for bringing the alternating flux of the magnetic field into tune with the natural frequency of the test piece by varying the cycle of the alternating current and in others the oscillating field has been provided by an alternating current having a fixed cycle and provision has been made for adjusting the length of the test piece to obtain a natural frequency that will be in tune with the frequency of the magnetic field. In most of the devices of this type in the prior art, however, the frequency of vibration that may be set up by the electromagnetic means has limits imposed by the reluctance of the magnet cores and in substantially all of the devices only a single test piece may be practically tested at one time.

A general object of the present invention, therefore, is to provide fatigue-testing means of the resonant vibration producing type in which the frequency of the vibrations imparted to the test piece by a magnet is not dependent upon the cycle of an alternating flux through the magnet but, instead, is dependent upon the frequency of the mechanically produced relative movement of the vibration producing magnet and the test piece into and out of test piece deflecting relation to each other.

More particularly the invention aims to provide improved resonant fatigue testing apparatus of the magnetic deflection type in which the frequency of the resonant vibrations that are set up in the test piece may without difficulty be made so high as materially to shorten the time required to complete a fatigue test and in which, if desired, a plurality of test pieces may be fatigue tested simultaneously.

To this end the invention aims to provide a fatigue testing apparatus in which a test piece deflecting magnet is so arranged with respect to the holder for the test piece that, when a relative movement of the test piece holder and the magnet in a closed path is brought about, the test piece will be brought successively into and out of the field of magnetic pull of the magnet thus making the frequency of vibration imparted to the test piece by the magnet dependent upon the speed of relative movement of the test piece and magnet. In practice a series of magnets, substantially uniformly spaced along the path of relative movement of the test piece and magnets, will be employed, thus making the frequency of vibration imparted to the test piece the product of the number of magnets multiplied by the number of times each magnet passes the test piece or vice versa. Among the advantages of this arrangement are:

1. The avoidance of any necessity for deenergizing the magnet or magnets.

2. The possibility of locating a plurality of test piece holders along the path of relative movement of the magnet or magnets and test piece or pieces in such manner that a plurality of like test pieces may be subjected to the same fatigue test or, if desired, test pieces of the same structural material may be subjected simultaneously to different tests, as, for example, tests in which one piece is supported for cantiliver action, another piece is supported for beam action and a third piece is supported for resonant torsional vibration.

3. The practical removal of all limits upon the frequency of the resonant vibrations which may be set up in the test piece by the apparatus, thus very materially shortening the time required to complete a test.

Among the important features of the invention, in a practicable embodiment thereof, is the mounting of a plurality of magnets, which may be constantly energized during the operation of the apparatus, upon a rotatable disk or wheel in equiangular spacings about and at like radial distances from the axis of rotation of said wheel or disk, so that these magnets, as the wheel or disk is rotated, may have their fields brought successively into pulling relation to a test piece in a stationary holder arranged to hold the test piece in such manner that it extends into the path of travel of the magnetic fields and may be made to vibrate when thus subjected to the successive pulls of the magnets passing by it. Although this represents one of the simplest methods of effecting the desired relative movement of the test piece and the magnets past each other, it will be understood that the invention is not limited to effecting this relative movement by rotation of the magnet carrier and that where simulation to special conditions to which the structural material may be subjected in actual use requires other ways of effecting such relative movement they may be utilized without departing from the invention.

Another important feature of the invention, in a practicable embodiment thereof, is the provision of a holder for the test piece in which the test piece may be adjusted to provide a vibrating portion thereof having a natural frequency corresponding to the frequency imposed thereon by magnets moved past the piece at a uniform speed of travel, said holder having provision both for movement toward and away from the path of travel of the magnetic fields and for adjustment to bring the test piece closer to and farther away from the magnets themselves, when in the magnetic field, in order to vary the amplitude of vibration imposed on the test piece by the magnets.

An important advantage of the mounting of the magnets, in the above described relation to each other and to the axis of rotation, upon a disk or wheel is that if desired the magnets may have their poles so exposed on both faces of the wheel or disk that test piece holders may be located on both sides of the wheel or disk, thus duplicating the number of test pieces which may be fatigue tested simultaneously by a single magnet-carrying rotor.

Other advantages, important features and objects of the invention to which attention has not hereinabove specifically been directed will appear hereinafter when the following description and claims are considered in connection with the accompanying drawings, in which—

Figure 2 is a partial plan view of the rotor part of the apparatus showing how electromagnets may be substituted, if desired, for permanent magnets;

Figure 3 is a section on the line 3—3 of Figure 2;

Figure 4 is a wiring diagram of the rotor shown in Figures 2 and 3; and

Figure 5 is a vertical section through still another modified rotor and holder construction in which the magnets, carried by the rotor, are arranged to exert a pull upon each side of the rotor thus permitting the simultaneous fatigue testing of test pieces located on opposite sides of the rotor as well as arranged in different angular positions about the axis thereof.

Figure 1:
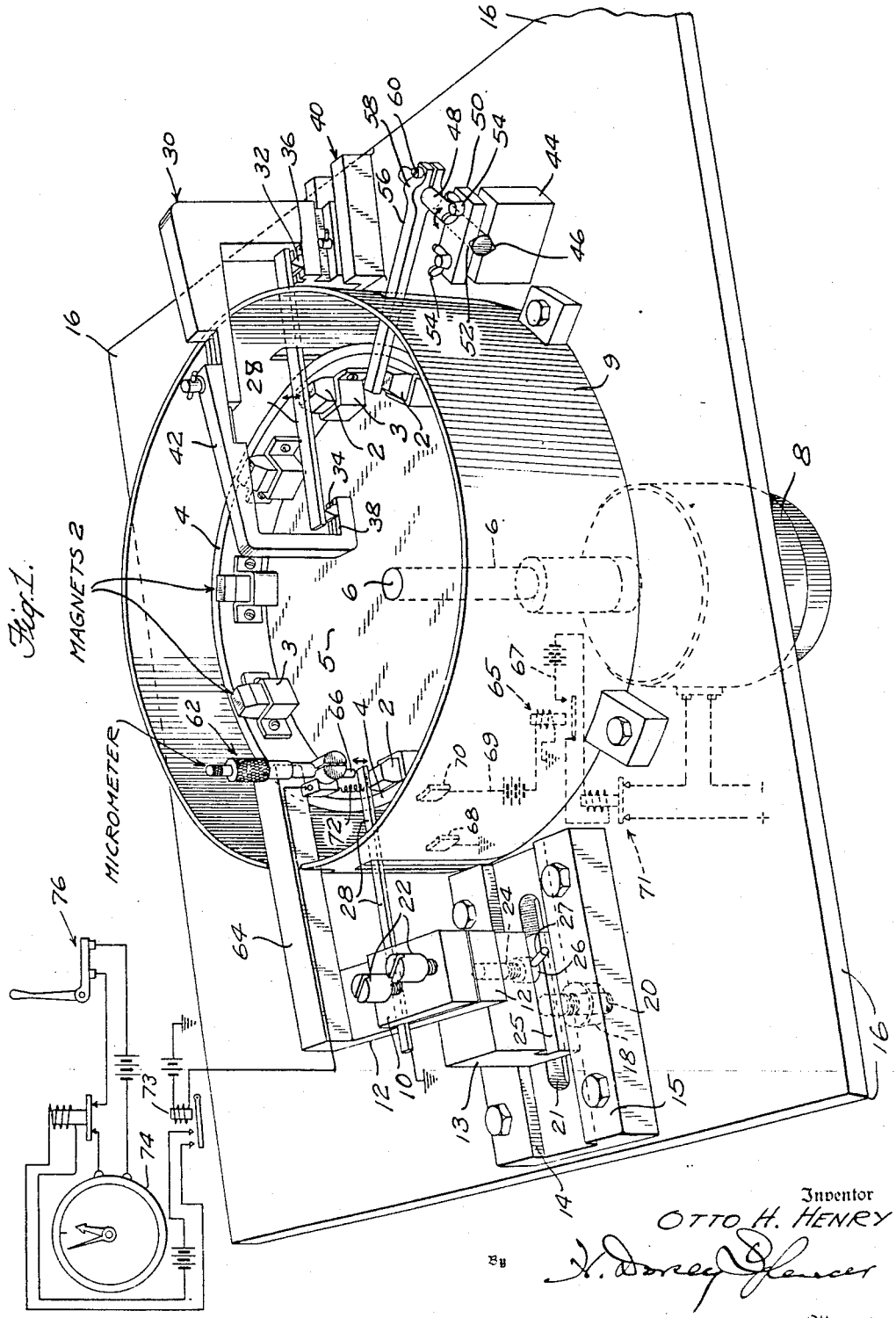
Figure 1 is a perspective view of resonant vibration fatigue testing apparatus embodying the present invention, this view showing apparatus in which permanent magnets are employed.

In the embodiment of the invention shown in Figure 1, a series of permanent magnets 2, preferably made of some high magnetic alloy, such as that sold under the trade name Alnico, are attached by straps or clamps 3 to the inner periphery of the flange or rim 4 of a rotatable disk or flywheel 5 attached to the upper end of a vertical shaft 6 driven by a constant speed electric motor 8. The magnets 2 are preferably equiangularly spaced about the axis of the shaft 6 and are at like radial distances from said shaft axis. The magnets 2 are also preferably of approximately uniform strength so that the magnetic fields which they bring successively into and out of pulling relation to the test pieces are substantially uniform. The rotating wheel or disk 5 is preferably surrounded by a protective shield 9 to insure against accidents at the relatively high speed of rotation of the wheel or disk 5. The wheel or disk 5 is also preferably made of some non-magnetic material such as aluminum.

As shown in Figure 1, a plurality of holders for test pieces may be located about the axis of rotation of the wheel or disk 5 in position to present their test pieces in the path of travel of the magnetic fields created by the magnets 2. When the material to be fatigue tested is to be supported so that it has a free vibrating end, whereby it may be subjected to what is commonly referred to as "cantilever testing," it may have one end held in a vise or clamp, as shown at the left hand side of Figure 1, this vise or clamp comprising an upper jaw 10 cooperating with a base or lower jaw 12 mounted upon a carrier 13 which is adjustable toward and away from the path of travel of the magnets 2 in a guideway 14 in a support 15 fixed upon the base 16. The carrier 13 may be secured in its different positions of adjustment toward and away from the path of travel of the magnets 2 by a clamp nut 18 threaded upon a stud 20 extending through the slot 21 to the under side of the base 16. Clamp screws 22 extending through the upper jaw 10 into the lower jaw 12 serve to clamp the cantilever test piece 28 in its desired adjusted relation to the magnet carrying rotor 5. The lower just 12 is mounted upon the upper end of a vertically adjustable support 24 extending through the slot 25 in the carrier 13 and threaded to receive an adjusting nut 26 confined in the slot 25 and having operating spokes 27. This provides for bodily adjustment of the clamp vertically to move test piece toward and away from magnet.

As hereinabove suggested, the length of the test piece 28 which projects from the clamp will be such, in respect to its other dimensions, that its natural frequency of vibration will correspond to the number of deflections imposed upon it by the magnets 2 as they are carried past it at the constant speed of rotation of the motor 8, thus insuring resonant vibration. If, for example, the motor 8 has a constant speed of rotation of 1700 R. P. M. and 10 magnets 2 are mounted on the disk 5 in series about the axis thereof, then the adjustment of the test piece 28 to insure resonant vibration will have to be such that its exposed vibrating portion has a natural frequency of vibration of 17,000 per minute.

Although the attuning of the natural frequency of the test piece 28 to the frequency of vibration imposed upon it by the magnets 2 is shown as accomplished, in Figure 1, by adjusting the test piece 28 until the vibrating portion thereof has a natural frequency corresponding to that imposed upon it by the magnets 2, thus producing resonant vibration of the test piece 28, it will be understood that the invention does not exclude substituting a variable speed motor for the constant speed motor 8, thus permitting attuning of the imposed vibrations to the natural frequency of a test piece without adjustment of the test piece itself. I have found, however, that the illustrated method of securing and maintaining resonant vibration is the more practicable, since variable speed motors present difficulties in the way of maintaining them adjusted to the resonance producing speeds.

When the test piece to be fatigue tested is to be supported in beam fashion, this may be done, as shown in Figure 1, by providing a bracket 30 extending to both sides of the path of travel of the magnets 2.

If, as above stated, the motor 8 is a constant speed motor, then it will be apparent that provision must be made on the bracket 30 for adjustment of the beam-supporting knife edges 32 and 34 toward and away from each other to provide a beam span for the test piece 28 supported thereby of a length having a natural frequency of vibration corresponding to the frequency of the deflections imposed upon the beam by the magnets as they are carried past the beam by the constant speed rotation of the carrier wheel 5. Such adjustment may be made within narrow ranges by providing for adjustment of the knife edges 32 and 34 on their respective supporting ledges 36 and 38 on the bracket 30. If greater adjustment be needed for a different type of test piece, provision may be made for adjusting the bracket 30 upon the carrier 40 and for varying the length of the arm 42 of the bracket to compensate for any adjustment of the bracket 30 toward and away from the shield 9.

When the test piece to be fatigue-tested is to be subjected to a torsional fatigue test; in other words, to have imparted thereto a torsional vibration, it may be supported in a holder, such as shown at the right in Figure 1, comprising a base clamp member 44 supported on the machine base 16 and having in its jaw a V-shaped recess 46 to receive the cylindrical test piece 48. The upper jaw 50 of the clamp has a corresponding recess 52 to engage the upper side of the cylindrical test piece 48. The jaw 50 may be secured in clamping relation to the test piece 48 and lower jaw 44 by clamp screws 54.

To effect the torsional vibration of the test piece 48, an arm 56, having a clamping jaw 58, at one end thereof, shaped to receive the test piece 48 and arranged to be held in clamping relation thereto by a clamp screw 60, projects into the field of the revolving magnets 2. The arm 56 is preferably of magnetic material or at least is provided with an armature of such material at its inner end so that, as each magnet 2 passes the overhanging inner end of the arm, it will cause said arm end to be deflected toward it thus setting up a torsional deflection in the test piece 48. By proper adjustment of the test piece 48 in the clamp the natural frequency of the torsional vibration of the part of the test piece 48 projecting from the clamp may be made to correspond to the frequency of the deflections set up in the system by the passage of the magnets by the inner end of the arm 56 thus setting up resonant torsional vibrations in the test piece 48.

For convenience in measuring the amplitude of vibration of a test piece a micrometer gauge 62 may be so mounted upon the inner end of an arm 64 carried by the lower clamping jaw 12 that the contact end 66 of said gauge will remain in its adjusted relation to the test piece 28 in all positions of vertical adjustment of the test piece clamp.

To prevent accidents, in case of a complete breakage of the test piece 28, whereby a part of the inner end thereof should separate from that held by the clamp jaws 10 and 12, provision is made for the operation of a relay 65 that in turn closes a switch-operating circuit 67 for shutting off the power to the motor 8. This may be done as shown by providing circuit terminals 68 and 70 so arranged between the shield 9 and the rim 4 of the rotor or wheel 5 that when the fractured end of the test piece 28 drops down it will close the relay circuit 69 and cause the operation of a switch opening circuit 67 of sufficient strength to open the switch 71 in the operating circuit to the motor 8.

In order that the number of vibrations to which the test piece 28 has been subjected may be recorded, means are preferably provided for starting a recording mechanism when resonant vibration of the test piece begins and for automatically stopping the recording mechanism when the test piece no longer vibrates. This may be done in various ways. I have found a satisfactory arrangement to comprise a light coil spring 72 of beryllium copper suspended above the inner end of the test piece 28 in such manner that when the test piece 28 is not vibrating the end of the coil spring 72 will contact with the test piece sufficiently to close a circuit having therein a relay 73 controlling a second circuit which will serve to effect the stopping of the recording mechanism. When, however, resonant vibration has been set up in the test piece 28 the frequency of such vibrations will be so much greater than the frequency of oscillation of the spring 28 that circuit-closing contact will not be made between the spring and the test piece or, in other words, the contact end of the spring 72 will be substantially maintained out of effective contact with the vibrating end of the test piece 28. When the fatigue test is completed, however, and the test piece 28 no longer vibrates, the contact end of the spring 72 will come to rest upon the test piece 28 and thus complete the circuit to the relay 73 controlling the operating circuit of the recording instrument 74, which may be an electric clock, thus causing the stopping of the clock.

In order to prevent the stopping of the clock 74 before resonant vibrations have been set up in the test piece 28, a switch 76 is provided which serves two purposes: When closed it starts the clock 74 and at the same time renders the relay circuit through the coil spring 72 potentially operative. By holding the switch 76 open until resonant vibrations are set up in the test piece 28 contact of the spring 72 with the test piece 28 will not operate the relay circuit which serves to stop the clock if running. At the same time the clock will not be started until the switch 76 has been closed. The switch 76 is intended to be manually operated and the test operator holds the switch 76 open until he hears the high-pitched sound set up by the resonant vibration of the test piece 28, at which time the spring 72 will be maintained in open circuit relation to the test piece 28, as hereinabove set forth. By moving the switch 76 to closed position, the operator then starts the clock 74 operating to time the test and at the same time prepares the relay circuit through the spring 72 for stopping the clock when the test is completed. By simply taking the time recorded by the clock and multiplying it by the number of vibrations per minute the total number of vibrations to which the test piece has been subjected can be ascertained.

In Figures 2, 3 and 4 of the drawings is illustrated the rotor part of a modification of the invention in which electromagnets are substituted for permanent magnets. Except for this substitution of electromagnets for permanent magnets the apparatus may otherwise be substantially the same as that shown in Figure 1.

As shown in Figures 2 and 3 the rotary disk 77 there shown, which is preferably of non-magnetic but electrically conductive material, such as aluminum, has mounted thereon a series of electromagnet coils 78, having soft iron cores 80, the coils 78, like the magnets 2 of Figure 1, being spaced preferably at equi-angular distances about the axis of the motor driven shaft 82 and also preferably at equal radial distances from the axis of said shaft 82.

One end of each coil 78 is grounded through the disk 77 and shaft 82 back to the armature ring 84 on shaft 82 and the other end of each coil 78 is connected through an insulated wire 85 passing down a hollow shaft 82 to the armature ring 88 which is insulated from the shaft 82. Brushes 90 and 92 engaging respectively the armature rings 84 and 88 serve for connection of the magnet coils 78 with a suitable source of energizing current. Preferably the amount of current flowing through the electromagnet coils 78 is maintained constant during the test operation. It will be understood, however, that the amplitude of vibration may to some extent be varied by varying the intensity of the current flowing through the coils 78 and thus correspondingly varying the amount of the induced magnetism in the cores 80.

In the modified form of the invention shown in Figure 5 permanent magnets 94, similar to the magnets 2 shown in Figure 1, are so mounted on a rotatable disk 96, preferably of non-magnetic material, such for example as aluminum, that one pole of each magnet projects above the upper face of the disk 96 and the other pole of each magnet projects below the lower face of the disk 96. This, it will be seen, permits a duplication of the number of test pieces that may be tested simultaneously.

As shown at the left in Figure 5, the holders for the test pieces 28 there shown comprise upper and lower clamps made up of movable clamp members 98 and relatively stationary clamp members 100, the member 100 of the upper clamp being formed as part of a vertical slide 102 to which the upper micrometer-gauge-carrying arm 104 is connected and the member 100 of the lower clamp being connected to a vertically adjustable slide 106 to which the lower micrometer gauge arm 108 is connected. A screw 110 operable by means of a hand wheel 112 may be used to effect the vertical adjustment of the upper clamp slide 102 and a similar screw 114 operable by a hand wheel 116 serves to effect the vertical adjustment of the lower slide 106. Both the screw 110 and the screw 114 are mounted in a part 118 fixed upon the base 120 of the modified form of the apparatus shown in Figure 5.

From the foregoing description the operation of the device will be apparent. Referring particularly to Figure 1, it will be seen that the test piece 28 shown at the left, which is mounted for cantilever testing, is held between the clamping jaws 10 and 12. Ordinarily the amount of projection of the test piece 28 from the clamp required to give a projecting length having a natural frequency of vibration equivalent to the frequency of deflection set up by the movement thereunder of the magnets 2 driven by the constant speed motor 8 can be predetermined by computation. If, however, the computed projection does not result in resonant vibration the projection of the test piece 28 from the clamp may be varied empirically until a length is found that has the desired natural frequency.

A test piece length having been obtained which has a natural frequency of vibration corresponding to the frequency of the deflections imposed upon the test piece by the passage thereunder of the magnets 2 driven by the constant speed motor 8, the operating circuit of the motor is closed and at the same time the switch 76 is held open until the motor and the magnet-carrying disk 5 driven thereby have attained their normal full speed, which can be determined by the resonant hum of the test piece 28. When this happens the switch 76 is closed, which does two things, as above pointed out, namely, it starts the timing mechanism 74 and it renders potentially operative the relay circuit of which the spring 72 forms one terminal and the test piece 28 the other terminal.

So long as the resonant vibration of the test piece 28 keeps up the relay circuit just referred to will not be closed since the spring 72 will not make a circuit-closing contact with the test piece 28 sufficient to actuate the relay 73 and cause stopping of the timing device 74. When, however, the test piece ceases to vibrate, because of fatigue, the spring 72 will effect a circuit closing contact with the test piece 28 and the timing device 74 will be stopped.

If, as above pointed out, fatigue testing should result in the actual breaking off of a portion of the test piece (which rarely happens, but which might cause injury to the apparatus if the magnet-carrying disk 5 continued to rotate) the dropping of the broken end of the test piece into circuit-closing contact with the circuit terminals 68 and 70 will close the relay circuit 69 and thus actuate a switch-opening circuit 67 of sufficient strength to open the switch 71 in the operating circuit of the motor 8 and thus stop the motor.

It will be understood that when the apparatus of the present invention is used for resonant fatigue testing of nonmagnetic materials, it will be necessary to provide the test piece with an armature of magnetic material at a point thereon within the magnetic field.

It will further be understood that the invention is not limited to producing magnetic deflections of the test piece in one direction only and that, by providing two disks with magnets acting on opposite sides of the test piece and with the magnets staggered on one disk with respect to those on the other, a positive magnetic pull can be exerted on each side of the test piece thus increasing the positiveness of the action of the testing apparatus.

What is claimed as new is:

1. Resonant vibration fatigue testing apparatus having, in combination, an apparatus frame, a holder for a test piece, a support having thereon a continuous series of substantially uniformly spaced magnets, said holder and said support being mounted on said frame for relative movement of said holder and said series of magnets past each other with the test piece carried by said holder successively presented in such proximity to the respective magnets of said series during the relative movement of the magnets and the holder that it is brought successively into and out of the fields of magnetic pull of said continuous series of magnets, and means for effecting such relative movement.

2. Resonant vibration fatigue testing apparatus according to claim 1 in which the test piece holder is stationary and the support for the continuous series of magnets moves relatively thereto.

3. Resonant vibration fatigue testing apparatus according to claim 1 in which a plurality of similarly mounted test piece holders are so spaced along the series of magnets that the test piece carried by each holder is successively presented in proximity to the respective magnets of said series during the relative movement of the magnets and the holders that it is brought successively into and out of the fields of magnetic pull of said continuous series of magnets whereby a plurality of test pieces may be tested simultaneously.

4. Resonant vibration fatigue testing apparatus according to claim 1 in which the support for the continuous series of substantially uniformly spaced magnets is constructed to carry these magnets in an annular arrangement about a central axis of rotation and the means for effecting the relative movement of the test piece holder and the magnets operate to effect the rotation of said support about its axis of rotation.

5. Resonant vibration fatigue testing apparatus according to claim 4 in which the magnet support is a rotatable disk having the continuous series of substantially uniformly spaced magnets exposed upon at least one of the disk faces in an annular arrangement about its axis of rotation.

6. Resonant vibration fatigue testing apparatus according to claim 1 in which the means for effecting the relative movement of the test piece holder and the series of magnets comprise an electric motor, the energizing circuit of which has a circuit breaker therein, and in which a relay circuit, having therein a relay for actuating said circuit breaker, has its terminals so located below the test piece that they will be bridged by the test piece in case of complete fracture thereof to close said relay circuit.

7. Resonant vibration fatigue testing apparatus having, in combination, an apparatus frame, a rotatable disk mounted on said frame and having on at least one of its faces a continuous series of magnets in an annular arrangement about the axis of rotation of said disk, a plurality of test piece holders mounted on said frame and spaced about the periphery of said disk, each of said holders being constructed to hold its test piece in such proximity to the path of travel of the continuous series of magnets that the magnets move successively into and out of magnetic pulling relation to the test piece.

8. Resonant vibration fatigue testing apparatus according to claim 7 in which test piece holders spaced about the periphery of the disk are constructed to support test pieces for several simultaneous different types of fatigue test.

9. Resonant vibration fatigue testing apparatus according to claim 7 in which one of the test piece holders spaced about the periphery of the magnet-carrying disk is constructed to support a test piece in cantilever fashion, another is constructed to support a test piece in beam fashion and a third is constructed to support its test piece for a torsional vibration test.

10. Resonant vibration fatigue testing apparatus according to claim 7 in which each face of the disk presents a continuous series of magnets in an annular arrangement about the axis of rotation of said disk and test piece holders are located in position to present the test pieces in cooperative relation to the magnet series of the respective faces.

OTTO H. HENRY.

REFERENCES CITED

The following references are of record in the file of this patent:

UNITED STATES PATENTS

| Number | Name | Date |
| --- | --- | --- |
| 2,171,303 | De Forest | Aug. 29, 1939 |
| 2,404,584 | Liska et al. | July 23, 1946 |
| 2,450,939 | Cor | Oct. 12, 1948 |

FOREIGN PATENTS

| Number | Country | Date |
| --- | --- | --- |
| 853,266 | France | Mar. 14, 1940 |